Patented Jan. 11, 1949

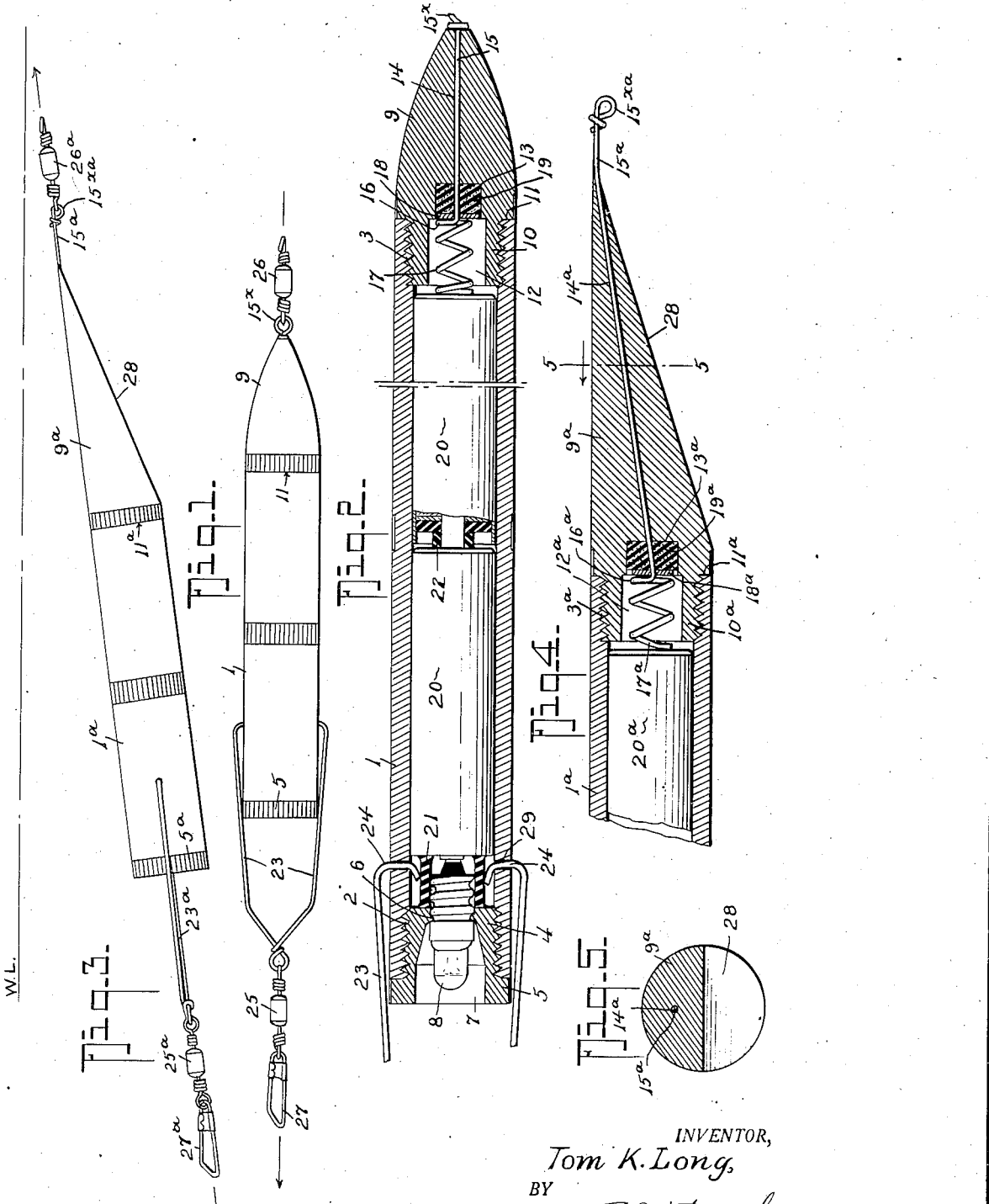

2,458,611

UNITED STATES PATENT OFFICE 2,458,611

ILLUMINATING UNIT FOR CONVENTIONAL FISHING LURES OR BAIT

Tom K. Long, Akron, Ohio

Application September 16, 1946, Serial No. 697,335

3 Claims. (Cl. 43—44)

My invention relates to the art of trolling, casting and still fishing and it particularly has for its objects, to provide a fish lure or bait illuminating unit to which any conventional fishing lure or bait (natural or artificial) can be connected, the construction of the unit being such that a beam or pencil of light will be directed on the lure or bait; to provide a unit for the purpose stated that is independent of or separate from the fish lure or bait, i. e. is not a part of the bait or lure and has no means for hooking, trapping, gaffing or netting fish; to provide a unit in which the light beam is so designed through the bulb and reflector as not to act as a lure or bait itself but simply to function as a means to render the lure or bait luminous; to provide a unit the body and end attachments (swivels, etc.) of which are so colored as to blend as nearly as possible with the color of the water or be so opaque as not itself to attract or frighten the fish; to provide a unit which is streamlined, and which the weight of the equipment is such as to act as a sinker; to provide a unit the forward end of which is detachable so that other forms of end members can be used if desired as will later more fully appear.

Other objects will in part be obvious and in part will be pointed out hereinafter.

To the attainment of the aforesaid objects and ends the invention also resides in the novel details of construction, combinations and arrangement of parts which will be hereinafter first fully described and then be specifically pointed out in the appended claims, reference being had to the accompanying drawing in which Fig. 1 is an elevation showing one embodiment of my invention.

Fig. 2 is an enlarged central longitudinal section of the same.

Fig. 3 is a side elevation of a modified form of the invention.

Fig. 4 is an enlarged detail longitudinal section of the same.

Fig. 5 is cross section on the line 5—5 of Fig. 4.

In the drawing, in which like numerals and letters of reference indicate like parts in all the figures, 1 is a tubular body having its ends internally threaded as at 2 and 3. The rear end of the body receives the externally threaded socket member 4 which has a recess with a light reflecting surface 7 and which has a flange 5, the outer diameter of which corresponds to that of the body 1. The member 4 also has a threaded opening to receive the threaded base of a light bulb 8.

The front end of the body 1 is closed by a member 9 which has an externally threaded end 10 and a shoulder 11 to abut the front end of the body, the greatest diameter of the member 9 corresponding to that of the barrel 1. The housing parts 1, 4 and 9 are made of metal to serve as a conductor for electricity as will later more fully appear.

In the embodiment shown in Figs. 1 and 2 the member 9 is somewhat bullet shaped or streamlined, while in the embodiment shown in Figs. 3 and 4 the member 9a is somewhat wedge shaped, to provide a flat under face 28 the purpose of which is that of an aquaplane to give a lift to the device and attached conventional lures and baits, while fishing in shallow water.

The member 9 has a recess 12, in the inner end 13 of which is located an elastic plug 19. The plug 19 and the member 9 have a longitudinal bore or passage 14 for a wire 15, the outer or forward end of which is coiled, as at $15^x$, for connection to a swivel 26, to which the fishing line (not shown) is to be connected.

The inner end of the wire 15 is coiled or otherwise shaped to provide an abutment 16 and battery cell engaging member 17 which member may have some spring action but not enough to engage the cell 20 when wire 15 is pulled forwardly (or member 9 pulled backwardly) to compress the plug 19. A metal or hard fiber disc 18 may be provided between coil 17 and resilient plug 19 to prevent the coil cutting into the plug as the plug is compressed. The plug 19 also serves as a water sealing gasket to prevent possible passage of air or water through the bore 14.

As will be seen by reference to Fig. 2 the electric circuit for energizing the lamp includes the battery cells 20, wire member 17, 14, and members 9, 1, and 4, from the threaded shell of the light bulb through the light filament and usual contact to the adjacent cell 20 as is common practice in flashlights.

If desired rubber rings or short tubes 21, 22 may be employed as shown in Fig. 2 to prevent short circuiting the battery cells should, per chance, water get into the body 1. Ordinarily, with proper machining of the parts 14 and 9, water will not enter the device.

The body 1, at diametrically opposite points between the end of the member 4 and the adjacent battery cell 20, has holes 29 provided to receive the hook ends 24 of a bail 23, the bail having a loop to which a swivel 25 is attached.

A suitable connector 27 is attached to the swivel 25, to which connector a fish lure or bait of the desired selection can be attached. In the drawing the connector 27 is shown as being of the safety pin type, but other types can be used if found more desirable in practice.

In Figs. 3 and 4, those parts which correspond to like parts in Figs. 1 and 2 bear the same reference characters plus the index letter *a*.

I desire it distinctly understood that my device is not a fish lure or bait and is not intended to be swallowed or mouthed by the fish. It is purely a lure or bait illuminating unit complete in itself and saleable as such.

In order that the device per se will not attract fish all exposed surfaces (except reflector surface 7) of the parts shown, are electrolytically anodized or colored, preferably sea green, so as to render the same invisible as possible to the fish and also to render the same salt and corrosive resistant and adapted to deep sea fishing as well as to fresh water fishing.

When, during fishing, a fish is caught the added pull on the line will cause compression of plug 19 and consequently effect disengagement between member 17 and the adjacent battery cell 20, thus extinguishing the light.

So long as the tension on the fishing line is constant the light will remain steady. If, however, it is desired to have the conventional lure or bait illuminating spasmodically this can be accomplished by the fisherman giving repeated sharp jerks to the fishing line.

By virtue of the fact that the parts comprising my device are streamlined as shown, the device will not foul in weeds and, therefore, is a weedless piece of equipment.

From the foregoing description taken in connection with the accompanying drawing it is thought the complete construction, operation and advantages of my invention will be clear to those skilled in the art to which it appertains.

What I claim is:

1. In fishing appliances of the kind wherein fishing lures are provided for connection to a line, the improvement which comprises a lure-illuminating unit which includes a tubular body, a light bulb countersunk within the rear end of said body, a bail secured to said body adjacent said rear end, a swivel connected to said bail, a member connected to said swivel, to which member a conventional lure may be connected for illumination by the beam from said light bulb, a battery cell in said tubular body, a front closure member for said body which member has battery cell engaging means, and a swivel connected with said front closure member and adapted for connection to a line, said front closure member itself being a sub-unit having a recess in its inner end and having a longitudinal bore, a draft wire passed through said bore and provided at its outer end with a loop and provided at its inner end with a battery-contacting element, and a compressible water-excluding element in the bottom of said recess against which said battery-contacting element seats and through which said wire also passes, said wire having limited longitudinal movement in said bore for purposes described.

2. In fishing appliances of the kind wherein fishing lures are provided for connection to a line, the improvement which comprises a lure-illuminating unit which includes a tubular body, a light bulb countersunk within the rear end of said body, a bail secured to said body adjacent said rear end, a swivel connected to said bail, a member connected to said swivel, to which member a conventional lure may be connected for illumination by the beam from said light bulb, a battery cell in said tubular body, a front closure member for said body which member has battery cell engaging means, and a swivel connected with said front closure member and adapted for connection to a line, said front closure member itself being a sub-unit having a recess in its inner end and having a longitudinal bore, a draft wire passed through said bore and provided at its outer end with a loop and provided at its inner end with a battery-contacting element, and a compressible water-excluding element in the bottom of said recess against which said battery-contacting element seats and through which said wire also passes, said wire having limited longitudinal movement in said bore for purposes described, said front closure member having an inclined flat bottom face for purposes described.

3. In fishing appliances wherein fishing lures are provided, the improvement which comprises a tubular body to the rear of which conventional lures are attachable, a lure-illuminating light bulb attached to the rear end of said body, a bulb-energizing battery cell in said body, a front closure member for said body, said front closure member itself constituting a sub-unit having a recess in its inner end and having a longitudinal bore, a draft wire passed through said bore and provided at its outer end with a loop and provided at its inner end with a battery-contacting element, and a water-excluding resilient element in the bottom of said recess against which said battery-contacting element seats and through which said wire also passes, said wire having limited longitudinal movement in said bore to enable said battery-contacting element to break and make the circuit at times while the lure is in use.

TOM K. LONG.

REFERENCES CITED

The following references are of record in the file of this patent:

UNITED STATES PATENTS

| Number | Name | Date |
|---|---|---|
| 1,086,256 | Wilber et al. | Feb. 3, 1914 |
| 1,190,730 | Corcoran | July 11, 1916 |
| 1,394,313 | Leeper | Oct. 18, 1921 |
| 1,529,949 | Good | Mar. 17, 1925 |
| 1,546,701 | Bailer | July 21, 1925 |
| 1,759,381 | West | May 20, 1930 |
| 2,088,201 | Goertzen | July 27, 1937 |
| 2,122,215 | Saelen | June 28, 1938 |
| 2,431,420 | Pope | Nov. 25, 1947 |